United States Patent
Kitanaka

(10) Patent No.: US 8,148,003 B2
(45) Date of Patent: Apr. 3, 2012

(54) POWER STORAGE APPARATUS

(75) Inventor: Hidetoshi Kitanaka, Toyko (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 918 days.

(21) Appl. No.: 11/921,571

(22) PCT Filed: Apr. 12, 2006

(86) PCT No.: PCT/JP2006/307754
§ 371 (c)(1),
(2), (4) Date: Dec. 5, 2007

(87) PCT Pub. No.: WO2007/122672
PCT Pub. Date: Nov. 1, 2007

(65) Prior Publication Data
US 2009/0130540 A1 May 21, 2009

(51) Int. Cl.
*H01M 6/42* (2006.01)
*H01M 2/00* (2006.01)
*H01M 2/10* (2006.01)

(52) U.S. Cl. ............... 429/150; 429/61; 429/97

(58) Field of Classification Search ........... 429/149, 429/150, 61, 97; 361/115
See application file for complete search history.

(56) References Cited

U.S. PATENT DOCUMENTS

| 5,818,236 A * | 10/1998 | Sone et al. .......... 324/509 |
| 6,621,273 B2 * | 9/2003 | Takada et al. ........ 324/433 |
| 2003/0010373 A1 * | 1/2003 | Tsuzuki et al. ...... 136/244 |

FOREIGN PATENT DOCUMENTS

| JP | 57-122626 A | 7/1982 |
| JP | 2-231966 A | 9/1990 |
| JP | 2002-359385 A | 12/2002 |

OTHER PUBLICATIONS

Yasunao Sekijima et al., "Development of Power Storage System for DC Rolling Stock Applying Electric Double Layer Capacitor", IEE Japan, 2005, pp. 253-254.
International Search Report of PCT/JP2006/307754, Jun. 6, 2006.

* cited by examiner

*Primary Examiner* — Ula C. Ruddock
*Assistant Examiner* — Thomas H. Parsons
(74) *Attorney, Agent, or Firm* — Buchanan Ingersoll & Rooney PC

(57) ABSTRACT

In a power storage apparatus, for storing DC electric power, which is configured by connecting in series a plurality of modules each including a plurality of cells connected with one another, by providing two first switches at the input portion and at the output portion of the power storage apparatus and a second switch, in series with the modules, at a connection position where the modules are connected, the voltage to ground in the apparatus is lowered.

10 Claims, 4 Drawing Sheets

POWER STORAGE APPARATUS

TECHNICAL FIELD

The preset invention relates to a power storage apparatus for storing DC electric power, and, for example, to a power storage apparatus that can be applied to an electric rolling stock or the like equipped with a power storage system.

BACKGROUND ART

To date, it has been known that, by applying a power storage device, such as a secondary battery or an electric double layer capacitor, to an electric railway system so as to configure the electric railway system in such away that superfluous regenerative electric power generated while the vehicle is braked (during a regenerative period) is stored in the power storage device and the stored electric power is utilized while the vehicle is accelerated (during a power running period), the kinetic energy of the vehicle can effectively be utilized (e.g., Non-Patent Document 1).

[Non-Patent Document 1]
Institute of Electrical Engineers of Japan, national convention 5-176, 2005, "Development of Power Storage System for DC Rolling Stock applying Electric Double Layer Capacitor"

A smallest element of a power storage device utilized for the power storage system is referred to as a cell and a plurality of cells connected in a series-parallel fashion is referred to as a module. A necessary voltage and a necessary current are obtained by further connecting a great number of the modules.

DISCLOSURE OF THE INVENTION

Meanwhile, in the case where the power storage device is applied to an electric railway system, a great number of modules are connected in series; the voltage to ground thereof is as high as 750 V to 1500 V. When, among power storage devices, a secondary battery, in particular, is completely discharged, the lifetime thereof becomes extremely short; therefore, even while the power storage system is not in operation, the power storage device is left charged, whereby the voltage to ground is maintained as high as 750 V to 1500 V. Accordingly, it has been a problem that the deterioration in the insulators in the power storage apparatus is accelerated due to a long-term charging; in addition to that, during repair and maintenance of the power storage apparatus, stringent insulation treatment is required.

The present invention provides a power storage apparatus that lowers the voltage to ground therein while being in the stop mode so as to suppress the deterioration in the insulators, thereby allowing the insulation treatment during repair and maintenance to be simplified.

A power storage apparatus according to the present invention includes two or more modules, connected in series one another, each of which is configured with a plurality of cells connected with one another; a grounding resistor for grounding a connection position where the modules are connected to each other; and first switches inserted at an input portion and an output portion.

In the case where the power storage apparatus is not operated, the voltages to ground at given positions in the power storage apparatus can be lowered; therefore, the voltages across the insulators (unillustrated) in the apparatus can be reduced, whereby the progress of the deterioration in the insulators can be suppressed.

BEST MODE FOR CARRYING OUT THE INVENTION

Embodiment 1

Figure 1:
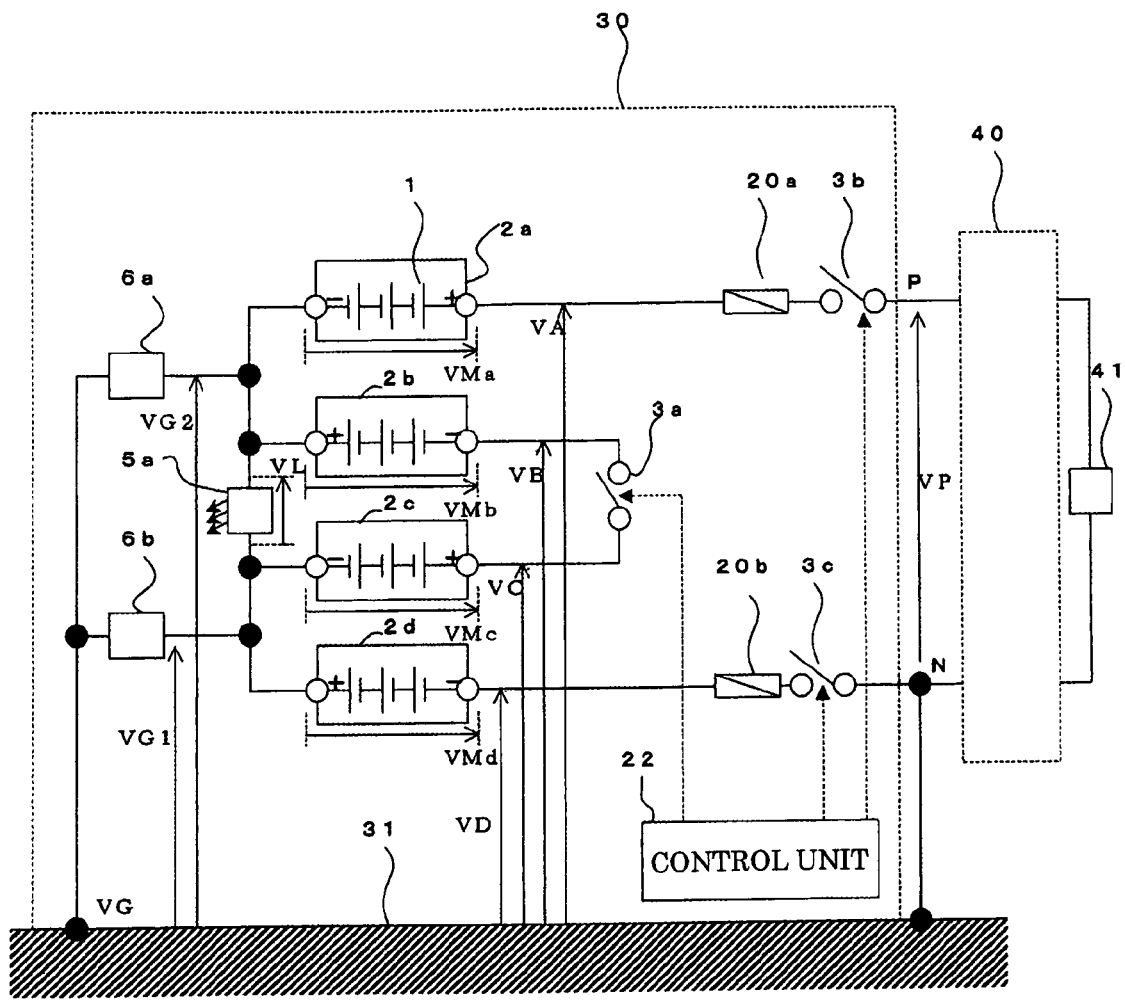
FIG. 1 is a diagram illustrating a configuration example of a power storage apparatus according to Embodiment 1 of the present invention.

FIG. 1 is a diagram illustrating a configuration example of a power storage apparatus according to Embodiment 1 of the present invention. The configuration of a power storage apparatus 30 will be explained with reference to FIG. 1. As illustrated in FIG. 1, modules 2a to 2d, in each of which cells 1 are connected in a series-parallel fashion, are connected in series. A switch 3a (a second switch) is provided between the negative electrode terminal of the module 2b and the positive electrode terminal of the module 2c, thereby dividing the modules 2a to 2d into two groups, i.e., a group of the modules 2a and 2b and a group of the modules 2c and 2d. Additionally, a display device 5a is provided between the positive electrode terminal of the module 2b and the negative electrode terminal of the module 2c. In this case, the display device 5a, which is a device for visually indicating whether or not a voltage exists, by, e.g., blinking an LED, operates when a specific voltage is generated between the positive electrode terminal of the module 2b and the negative electrode terminal of the module 2c.

The negative electrode of the module 2a and the positive electrode of the module 2b are connected to the reference electric potential plane 31 via a grounding resistor 6a; the negative electrode of the module 2c and the positive electrode of the module 2d are connected to the reference electric potential plane 31 via a grounding resistor 6b. Here, the grounding resistors 6a and 6b are resistors each having resistance on the order of several MΩ. The reference electric potential plane 31 is the ground having the ground electric potential. Furthermore, the positive electrode of the module 2a is connected to a P line via a fuse 20a and a switch 3b (a first switch), and the negative electrode of the module 2d is connected to an N line via a fuse 20b and a switch 3c (a first switch); the P line and the N line are connected to a power conversion system 40 having a load 41.

In addition, the switches 3a to 3c are configured in such a way that the closing and opening thereof are controlled by a control unit 22. In general, in the case where the power storage apparatus 30 is operated, the switches 3a to 3c are closed, and in the case where the power storage apparatus 30 is stopped, the switches 3a to 3c are opened. Additionally, outside the power conversion system 40, the N line is connected to the reference electric potential plane 31.

Electric power accumulated in the power storage apparatus 30 is supplied to the load 41 by way of the power conversion system 40; on the other hand, the power storage apparatus 30 is charged with electric power from the load 41, by way of the power conversion system 40.

Next, a method, of lowering the voltage to ground in the power storage apparatus 30, which is the purpose of the present invention will be explained. By configuring the power storage apparatus 30 as described above, the voltages to ground at given positions illustrated in FIG. 1, i.e., VG1, VG2, VA to VD, and VP are given by the equations below. In addition, here, for the better understanding of the explanation, it is assumed that the modules 2a to 2d each have the same configuration; the voltages VMa to VMd across the modules 2a to 2d, respectively, are the same and described "VM" as follows:

$$VM = VMa = VMb = VMc = VMd.$$

In the first place, the state in which the power storage apparatus 30 is in operation will be explained. Because the switches 3a to 3c are closed, the following equations are given:

$$VA = VP$$

$$VB = VC = \frac{1}{2} \times VP$$

$$VD = 0.$$

Moreover, $$VG1 = VD + (VC - VD)/2$$

$$VG2 = VB + (VA - VB)/2.$$

As a specific numerical value, assuming that, e.g., the voltage VM across each of the modules 2a to 2d is 250 V, the following voltages are given:

VA=1000 V
VB=500 V
VC=500 V
VD=0 V
VG1=250 V
VG2=750 V.

At the output terminal of the power storage apparatus 30, the voltage VP of 1000 V, which is the sum of the voltages across the respective modules 2a to 2d, is obtained. The maximal voltage to ground, which is VA, is 1000 V.

In the second place, the state in which the power storage apparatus 30 is not operated will be explained. Because the switches 3a to 3c are opened, no closed circuit is configured, whereby neither through the grounding resistor 6a nor through the grounding resistor 6b, any current flows; thus, because VG1=VG2=VG=0, the following equations are given:

$$VA = +VM$$

$$VB = -VM$$

$$VC = +VM$$

$$VD = -VM.$$

As a specific numerical value, assuming that, e.g., the voltage VM across each of the modules 2a to 2d is 250 V, the following voltages are obtained:

VG1=0V
VG2=0V
VA=250V
VB=−250V
VC=250V
VD=−250V, whereby at the output terminal of the power storage apparatus 30, no voltage is generated. The maximal voltage to ground, which is VA, is 250 V.

As described above, when the power storage apparatus 30 is not operated, the voltages to ground VG1 and VG2 can be lowered to 0 V, and the voltages to ground VA to VD can be lowered to the corresponding voltages VM across the modules 2a to 2d, respectively; therefore, the maximal voltage to ground can be made as low as one-fourth of the maximal voltage to ground in the case where the power storage apparatus 30 is operated.

In contrast, the circuit described in the conventional technique (Non-Patent Document 1) is configured in such a way that, when the power storage apparatus is not operated, only the switch provided at the positive electrode of the power storage apparatus can be opened; therefore, the voltage to ground is the same, whether the power storage apparatus is operated or not operated, and the voltage value is the sum of the voltages across all the respective modules.

As described heretofore, with the configuration according to the present invention, in the case where the power storage apparatus 30 is not operated, the voltages to ground at the given positions in the power storage apparatus 30 can be made as low as one-fourth of the voltage to ground in the case where the power storage apparatus 30 is operated; therefore, when the power storage apparatus 30 is not operated, the voltage across the insulators (unillustrated) in side the apparatus can be reduced, whereby the progress of the deterioration in the insulators can be suppressed. Moreover, when the power storage apparatus 30 is maintained, the insulation treatment can be simplified.

In addition, the display device 5a is provided in order to visually ascertain whether or not the opening operation of the switches 3a to 3c has securely been performed. The operation will be explained below.

The display device 5a has a function in which a voltage VL across the display device 5a is detected, and in the case where a voltage that is a specific value or larger exists, a display lamp is blinked so as to indicate that the voltage exists. In addition, for example, a means in which a buzzer is sounded instead of blinking the display lamp may be utilized.

In the case where the switches 3a to 3c are opened, the voltage VL across the display device 5a is 0 V; thus, the display device 5a does not operate.

Additionally, in the case where any one of the switches 3a to 3c is closed, the voltage VL across the display device 5a is not 0 V; thus, the display device 5a detects the voltage VL and operates.

By installing the display device 5a, configured as described above, inside the power storage apparatus 30 or at an external position where the display device 5a can be viewed, it is made possible that, before maintenance, it can visually be ascertained whether or not the switches 3a to 3c have securely been opened and the voltage to ground in the apparatus has been lowered.

In addition, although, in Embodiment 1, a configuration in which four modules are connected in series has been described, the configuration is not limited thereto; the power storage apparatus may similarly be configured in the same manner, as long as the configuration is in such a way that two or more modules are connected in series. Moreover, the configuration described in Embodiment 1 may be implemented, by constituting a new module with a number of modules connected in series and utilizing the new module as a constituent element.

Embodiment 2

Figure 2:
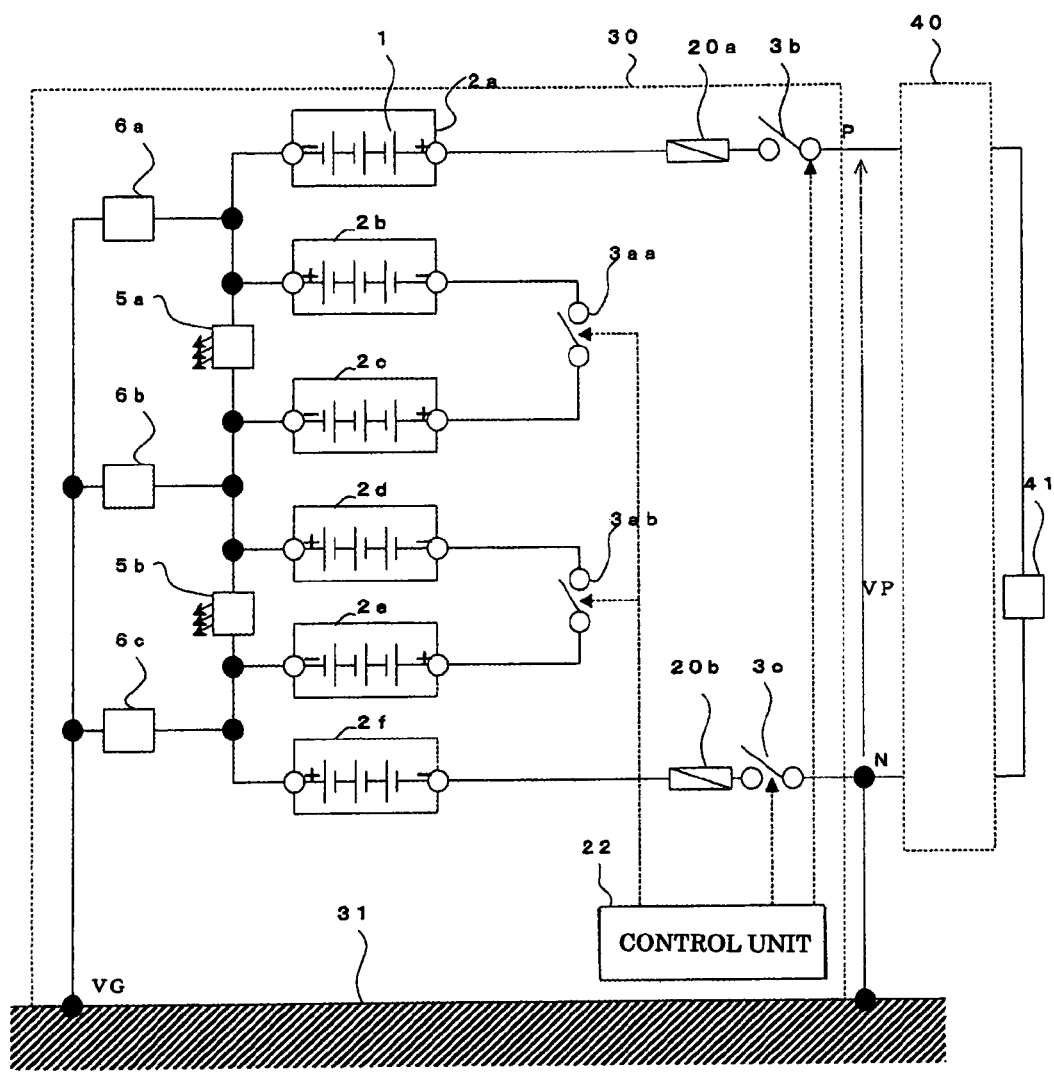
FIG. 2 is a diagram illustrating a configuration example of a power storage apparatus according to Embodiment 2 of the present invention.

FIG. 2 is a diagram illustrating a configuration example of a power storage apparatus according to Embodiment 2 of the present invention. FIG. 2 illustrates a configuration example in the case where the number of modules is six; the configuration is in such a way that modules 2e and 2f are added. In contrast to FIG. 1 which illustrates a case in which the number of modules is four, the configuration is in such a way that a switch 3ab is connected between the negative electrode of the module 2d and the positive electrode of the module 2e, a display device 5b is connected between the positive electrode of the module 2d and the negative electrode of the module 2e, and the connection point where the module 2e and the module 2f are connected is grounded to the reference electric potential plane 31, by way of a grounding resistor 6c.

As far as the operation is concerned, in the case where the number of modules is six, the explanation is the same as that for the case where the number of modules is four; therefore, the explanation will be omitted. With the configuration according to Embodiment 2, the maximal voltage to ground in the power storage apparatus is VP while the apparatus is operated; the maximal voltage to ground in the power storage apparatus is one-sixth of VP while the apparatus is not operated.

Embodiment 3

Figure 3:
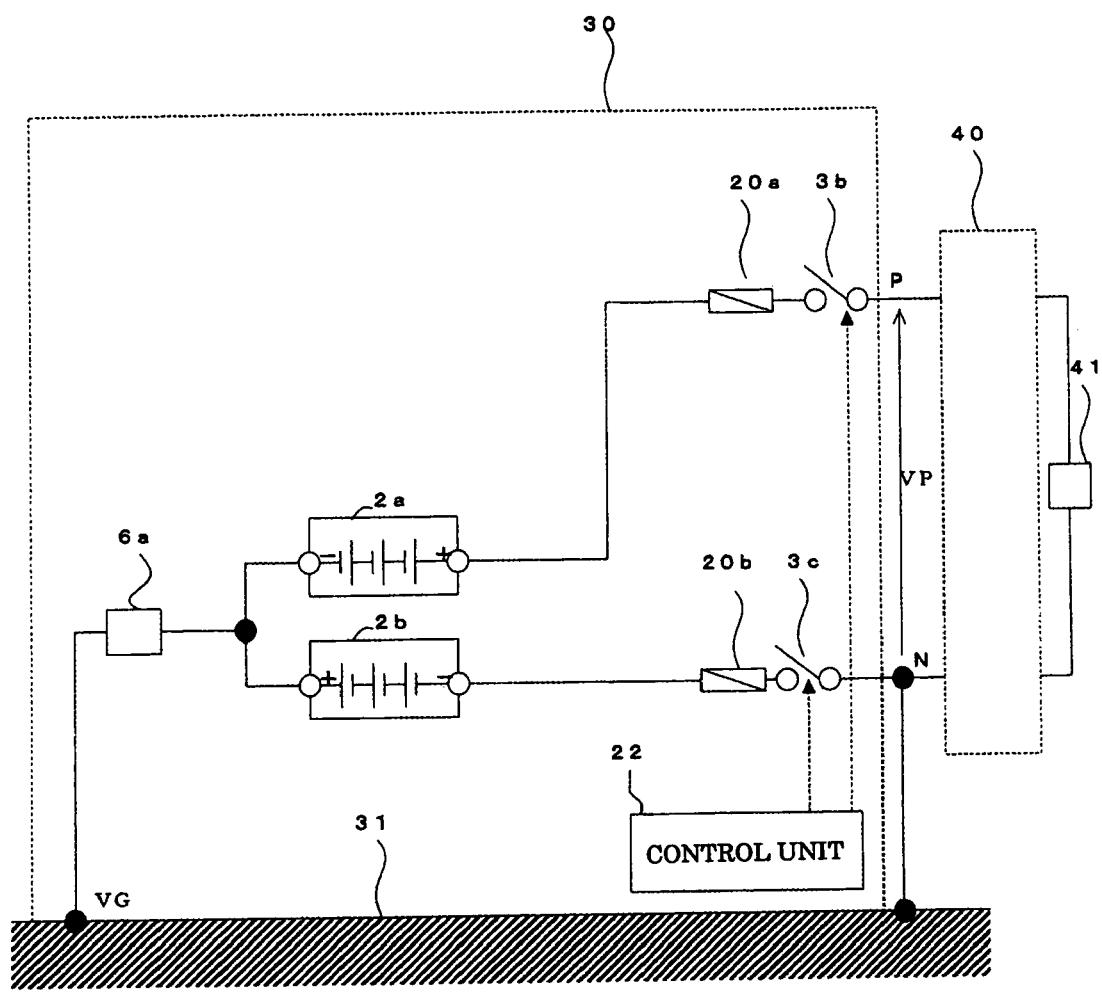
FIG. 3 is a diagram illustrating a configuration example of a power storage apparatus according to Embodiment 3 of the present invention.

FIG. 3 is a diagram illustrating a configuration example of a power storage apparatus according to Embodiment 3 of the present invention. FIG. 3 is a diagram illustrating a configuration example in the case where the number of modules is two. The same reference characters in FIG. 3 denote the same or equivalent constituent elements as those in FIGS. 1 and 2. In the case where the number of modules is two, the configuration is in such a way that the connection point where the modules 2a and 2b are connected is connected to the reference electric potential plane 31, by way of the grounding resistor 6a. With the configuration according to Embodiment 3, the maximal voltage to ground in the power storage apparatus is VP while the apparatus is operated; the maximal voltage to ground in the power storage apparatus is half of VP while the apparatus is not operated.

As described above, with configurations in Embodiments 1 to 3 of the present invention, in the case where the power storage apparatus 30 is not operated, the voltages to ground at the given positions in the power storage apparatus 30 can be lowered; therefore, the voltages across the insulators (unillustrated) in the apparatus can be reduced, whereby the progress of the deterioration in the insulators can be suppressed. Moreover, when the power storage apparatus 30 is maintained, the insulation treatment can be simplified. Moreover, by providing the display device, it is made possible to visually ascertain whether or not the switches have securely been opened.

Embodiment 4

Figure 4:
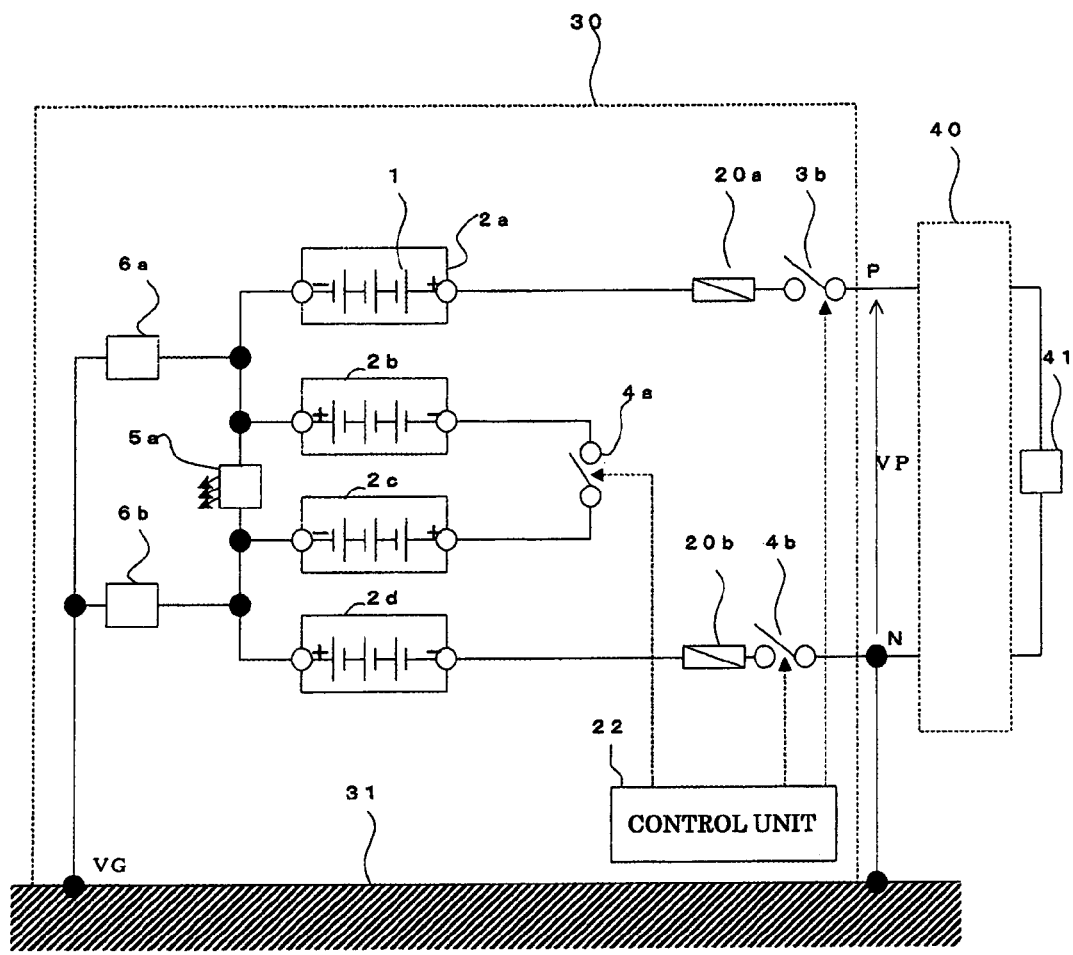
FIG. 4 is a diagram illustrating a configuration example of a power storage apparatus according to Embodiment 4 of the present invention.

FIG. 4 is a diagram illustrating a configuration example of a power storage apparatus according to Embodiment 4 of the present invention. Only the difference between Embodiment 4 and Embodiments 1 and 3 will be explained below.

It is the feature of Embodiment 4 that switches 4a and 4b illustrated in FIG. 4 are not capable of switching a current, but capable only of performing opening and closing, and the switch 3b is a switch capable of switching a current while the current flows.

Next, the operation timing among the switches 3b, 4a, and 4b will be explained. When the power storage apparatus 30 is activated, the sequence is in such a way that the switches 4a and 4b are preliminarily closed, and after that closing has securely been completed, the switch 3b is closed.

Additionally, when the power storage apparatus 30 is stopped, the sequence is in such a way that the switch 3b is preliminarily opened, and after that opening has securely been completed, the switches 4a and 4b are opened.

As described above, by making the switch 3b play the role of eventually configuring a circuit in which a current may generated and the role of firstly opening a circuit, it is made possible to limit the roles of the switches 4a and 4b to the opening and closing operation in the state in which no current is generated and no circuit has been configured.

In addition, it is the main point of Embodiment 4 that a switch capable of switching a current is utilized only for the switch that eventually configures a circuit or that firstly opens a circuit; therefore, the installation positions of the switches 4a, 4b, and 3b are not limited to the positions illustrated in FIG. 4, but may be interchanged.

In consequence, according to Embodiment 4 of the present invention, small-size switches incapable of switching a current can be utilized as the switches 4a and 4b; therefore, in addition to the effects of Embodiments 1 to 3, a small-size and lightweight power storage apparatus can be obtained.

The invention claimed is:

1. A power storage apparatus comprising:
   a plurality of modules, connected in series to one another, each of which is configured with a plurality of cells connected with one another; wherein the plurality of modules include a plurality of groups each comprising at least two serially connected modules as one group, and wherein the plurality of cells comprises at least a secondary battery,
   a grounding resistor for grounding a connection position, where the modules in each group are connected, to a ground potential by way of the grounding resistor, and wherein the grounding resistor is connected to electrodes of different polarities of adjacent modules,
   first switches respectively inserted between a first input line and a first power storage module in the series and between a second input line and a last power storage module in the series; and
   a second switch provided at a connection position where the groups are connected.

2. The power storage apparatus according to claim 1, wherein one of the first switches and the second switch are not capable of switching a current, but capable of performing only opening and closing in the case where no current exists.

3. The power storage apparatus according to claim 1, wherein an information device, for informing whether or not a voltage is applied across the information device, is connected between connection positions at each of which the modules in each group are connected in series.

4. The power storage apparatus according to claim 3, wherein the information device displays whether or not the voltage exists, by blinking a display lamp.

5. The power storage apparatus according to claim 3, wherein the information device gives information on whether or not the voltage exists, by sounding a buzzer.

6. The power storage apparatus according to claim 1, wherein the grounding resistor electrically connects the connection position between two modules to a ground potential.

7. A power storage apparatus comprising:
  a plurality of power storage modules, connected via respective connection positions in series to one another, for storing power, wherein the plurality of power storage modules comprises at least a secondary battery,
  at least one grounding resistor for electrically connecting to and for grounding of one of the respective connection positions, wherein the grounding resistor is connected to electrodes of different polarities of adjacent modules,
  a first switch connected between a first input line and a first power storage module in the series; and
  a second switch connected between a second input line and a last power storage module in the series.

8. The power storage apparatus of claim 7, wherein each power storage module includes a plurality of storage cells connected with one another.

9. The power storage apparatus of claim 7, wherein the at least one grounding resistor comprises a plurality of grounding resistors, each of the grounding resistors connected to a respectively different one of the connection positions.

10. The power storage apparatus of claim 7, wherein the at least one grounding resistor comprises at least first and second grounding resistors, the power storage module further comprising:
  a third switch connected between first and second adjacent power storage modules of the series of power storage modules to selectively connect or disconnect the first and second adjacent power storage modules from each other such that when the first and second adjacent power storage modules are disconnected, the first grounding resistor provides a first ground path for a first portion of the series of power storage modules connected to the first adjacent power storage module and the second grounding resistor provides a second, independent, ground path for the second portion of the series of power storage modules connected to the second adjacent power storage module.

* * * * *